(12) United States Patent
Stafford et al.

(10) Patent No.: US 9,015,771 B2
(45) Date of Patent: Apr. 21, 2015

(54) APPARATUS FOR SELECTED PROVISION OF LINEAR AND/OR CIRCULAR POLARITY SIGNALS

(75) Inventors: Gary Stafford, Stevenage (GB); David Smith, Stevenage (GB); Edmund F. Petruzzelli, Centennial, CO (US)

(73) Assignee: Global Invacom Limited, Stevenage, Hertsfordshire (GB)

( * ) Notice: Subject to any disclaimer, the term of this patent is extended or adjusted under 35 U.S.C. 154(b) by 850 days.

(21) Appl. No.: 11/576,797

(22) PCT Filed: Oct. 11, 2005

(86) PCT No.: PCT/GB2005/003905
§ 371 (c)(1),
(2), (4) Date: Aug. 16, 2007

(87) PCT Pub. No.: WO2006/040538
PCT Pub. Date: Apr. 20, 2006

(65) Prior Publication Data
US 2008/0060023 A1   Mar. 6, 2008

(30) Foreign Application Priority Data

Oct. 11, 2004   (GB) .................................. 0422529.8

(51) Int. Cl.
| | |
|---|---|
| H04N 7/20 | (2006.01) |
| H04H 20/74 | (2008.01) |
| H04H 40/90 | (2008.01) |
| H04N 21/6547 | (2011.01) |
| H04N 21/61 | (2011.01) |
| H01Q 15/24 | (2006.01) |
| H04B 1/00 | (2006.01) |
| H01Q 1/24 | (2006.01) |

(52) U.S. Cl.
CPC ........... *H04H 40/90* (2013.01); *H04N 21/6547* (2013.01); *H04N 7/20* (2013.01); *H04N 21/6143* (2013.01); *H01Q 15/242* (2013.01); *H04B 1/005* (2013.01); *H01Q 1/247* (2013.01)

(58) Field of Classification Search
USPC .......................................................... 725/69
See application file for complete search history.

(56) References Cited

U.S. PATENT DOCUMENTS

| | | | | |
|---|---|---|---|---|
| 5,860,056 | A * | 1/1999 | Pond | 455/13.3 |
| 6,192,217 | B1 * | 2/2001 | Farrell | 455/13.1 |
| 6,507,952 | B1 | 1/2003 | Miller et al. | |
| 6,931,245 | B2 * | 8/2005 | Fikart | 455/323 |
| 7,236,681 | B2 * | 6/2007 | Moheb et al. | 385/147 |
| 7,379,707 | B2 * | 5/2008 | DiFonzo et al. | 455/12.1 |

(Continued)

OTHER PUBLICATIONS

IPER for PCT/GB2005/003905.

*Primary Examiner* — Pankaj Kumar
*Assistant Examiner* — Usha Raman
(74) *Attorney, Agent, or Firm* — LeClairRyan, a Professional Corporation

(57) ABSTRACT

The invention relates to apparatus and method which can be used to receive broadcast digital data. The apparatus and method are provided at one or more receiving locations and is connected to one or more broadcast data receivers at each location. The apparatus is capable of receiving and processing data in linear and/or circular polarity formats and the operating condition of the same can be altered in response to a command signal broadcast to the receiving locations prior to the transmission of data in a new format such as to the change in the operating condition of the apparatus to receive and process linear as well as the previously broadcast circular polarity format data.

10 Claims, 1 Drawing Sheet

(56) References Cited

U.S. PATENT DOCUMENTS

| | | | |
|---|---|---|---|
| 7,526,249 B2* | 4/2009 | Waltman et al. | 455/12.1 |
| 8,040,206 B2* | 10/2011 | Stafford | 333/137 |
| 8,132,214 B2* | 3/2012 | Petruzzelli | 725/68 |
| 8,228,232 B2* | 7/2012 | Corman et al. | 342/362 |
| 2002/0152467 A1* | 10/2002 | Fiallos | 725/50 |
| 2002/0167449 A1* | 11/2002 | Frazita et al. | 343/756 |
| 2004/0029549 A1 | 2/2004 | Fikart | |
| 2004/0209584 A1* | 10/2004 | Bargroff et al. | 455/180.1 |
| 2005/0071877 A1* | 3/2005 | Navarro | 725/68 |
| 2005/0177743 A1* | 8/2005 | Barber et al. | 713/191 |
| 2005/0239426 A1* | 10/2005 | Berretta et al. | 455/227 |
| 2009/0021436 A1* | 1/2009 | Clymer et al. | 343/713 |

* cited by examiner

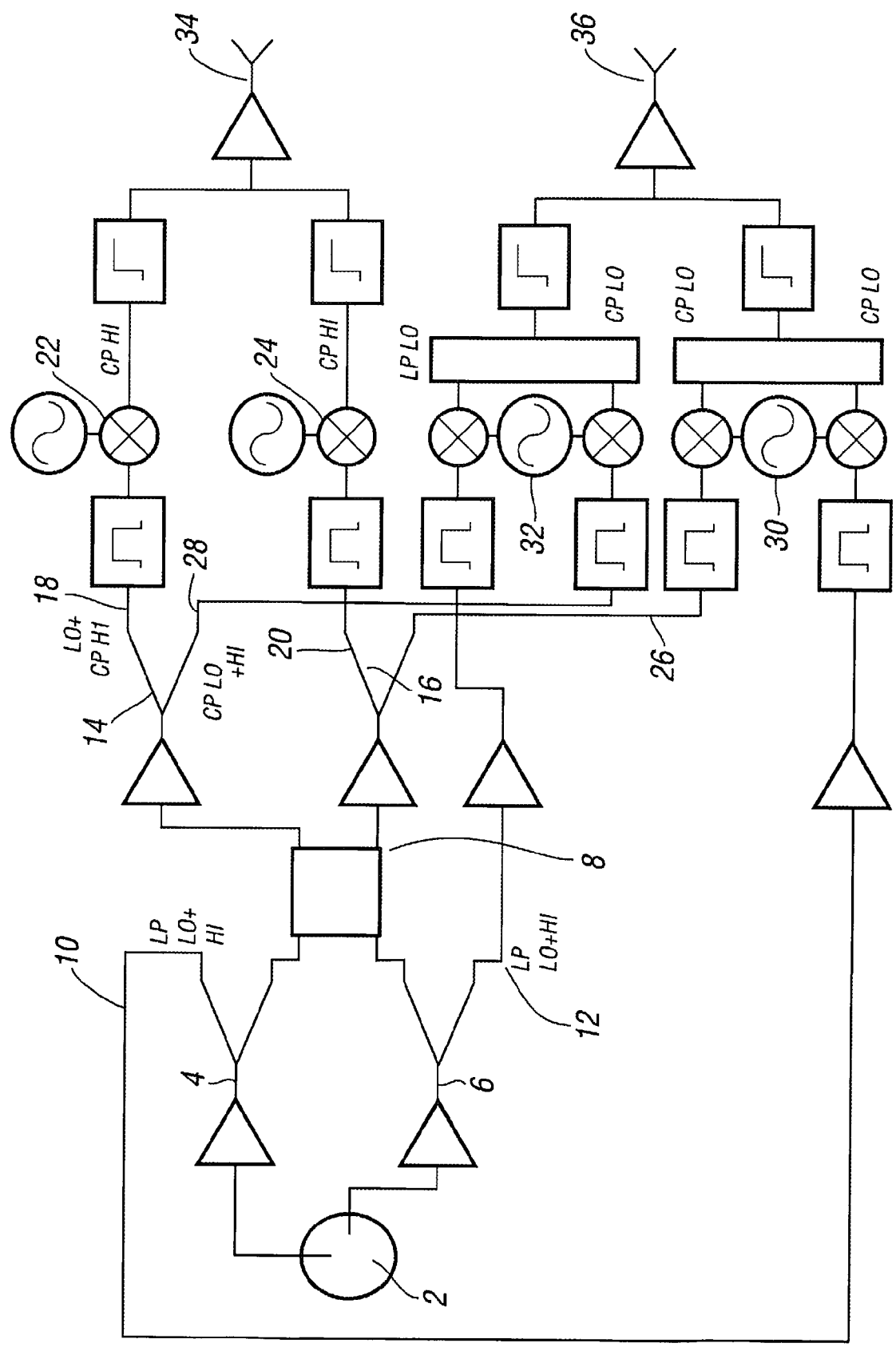

APPARATUS FOR SELECTED PROVISION OF LINEAR AND/OR CIRCULAR POLARITY SIGNALS

This application is a national stage application under 35 U.S.C. §371 from PCT Application No. PCT/GB2005/003905, filed Oct. 11, 2005, which claims the priority benefit of Great Britain Application No. 0422529.8, filed Oct. 11, 2004.

The invention to which this application relates is apparatus for use as part of a digital data broadcast system and particularly, although not necessarily exclusively, for use with data which is broadcast from a remote location or remote locations and received at a plurality of premises for subsequent processing and the generation of video and/or audio such as, for example, to form a television programme service.

Typically, at each of the locations where the broadcast data signals are to be received, receiving apparatus is provided externally of the premises in the form of a satellite antenna, a low noise block and a wave guide. This apparatus serves to receive the data and transfer the same internally of the premises whereupon the data can be processed via asset top box or broadcast data receiver and decoded and then passed to speakers and/or a display screen for presentation to a user.

Although the basic concept behind the broadcast of the data is common throughout the world, there are several different formats used.

Different formats are used with regard to the polarity of the signals which are transmitted from the satellite and, as a result, the available wave length over which said signals can be transmitted. In the majority of Europe, the satellite used to broadcast data does so with a linear polarity over a frequency range of 10.7 to 12.75 GHz. In USA, the data is transmitted with a circular polarity over a frequency range of 12.2 to 12.7 GHz.

It will therefore readily be appreciated that in U.S, there is a smaller bandwidth available for the transmission of data and, when one considers that the number of television channels and/or other services which can be supplied to an end user via the transmission of data has proliferated in recent years, so it will be seen that the available bandwidth is rapidly being filled. Also, in other countries, the problem may not be sever, but there may come a time when it is desired to transmit circular as well as linear polarity format data.

In the US a solution to this problem would be to transmit data with a linear polarity instead of or in addition to that which is transmitted with a circular polarity. However, the receiving apparatus at the premises, is designed to receive data with a particular polarity such that, at the moment, all apparatus which is currently fitted in U.S, is designed to receive data transmitted with a circular polarity. The cost implications means that conventionally, the apparatus, which is fitted by the service provider, has the minimum apparatus requirement for the data which has been transmitted conventionally.

Thus, at present, while there is a possible solution to the problem of limited bandwidth, in that the data can be transmitted with linear polarity, the same cannot currently be implemented as there are financial and practical implications. A financial implication is that in order to receive both circular and linear polarity data signals, two separate sets of apparatus will be required to be fitted to each of the premises and this would mean that for all the existing premises where the apparatus is already fitted, the same would have to be replaced, obviously at a cost in terms of the persons required to fit the same and furthermore, the additional equipment which is required to be fitted. The other problem is the practical implication of the numbers of apparatus already in position as this means that the time which would be required to replace the existing apparatus means that the switchover from broadcast of solely circular polarity data to circular and/or linear polarity data could not be implemented quickly or overnight, as would be desired. This therefore means that a number of subscribers would not be able to receive data broadcast in the new format of linear polarity for a significant period of time and may therefore object having to pay subscription costs.

The aim of the present invention is to provide a means whereby apparatus can be provided and indeed may be retrofitted which has a capability of selectively receiving circular and linear polarity formats of broadcast data and processing the same and which can be selectively operated at any given time to change and receive selected polarity formats.

In a first aspect of the invention, there is provided apparatus for receiving broadcast digital data, said apparatus including an antenna with which is mounted a low noise block (LNB) and which includes processing means to allow circular and linear polarity format data to be selectively received and processed, wherein said processing means includes a series of data outlets, data from said outlets being selectively accessed for the passage of data from said outlets to at least one broadcast data receiver for the generation of video and/or audio, said outlets selected in response to a user and/or broadcaster command which indicates whether the data is being received in either or both of linear or circular polarity format.

The invention therefore provides apparatus which is capable of operating in a format so as to provide the processing of, for example circular polarity data or linear polarity data but which also has the capability of processing the other of circular or linear polarity data. This means that if the broadcaster of the data wishes to start broadcasting data of either polarity or a combination of polarities, the apparatus condition can be changed to deal with the condition of the data which is going to start being broadcast to it at that time. In accordance with the invention, there is no need to install new apparatus as the change which is required to be performed at the premises is a change of control circuit state within the receiving apparatus externally of the premises. Thus, there is no need for a wholesale change of hardware. Furthermore, because the apparatus has the capability of dealing with linear or circular polarity data or any combination of the same when installed, and is capable of being switched between operating conditions which determine which of the data formats it is actually operated to receive and process once installed, so the schedule of installation to the conventional apparatus which already exists, can be implemented over a period of time prior to the changeover in the broadcast data format such that the change in data format can be made once all of the apparatus has been changed. Up until that time, the new apparatus which has been installed can be selected to operate in a conventional manner such, for example, to receive and process circular polarity data only and process the same.

In one embodiment, a signal or software download is transmitted to the receiving apparatus to indicate the change in the format. Alternatively, the indication to change the condition of the apparatus may be the first reception of the data in the new polarity format and the apparatus starts to process and make the data available in any combination of the formats once it starts to receive the same. In whatever case, the change is achieved without the need for physical, or mechanical switching at the premises and the change is achieved by the remote broadcast of the change signal.

In one embodiment the apparatus includes four oscillators connected to a mixer from which the appropriate data polarity formats can be selected for subsequent use dependent upon the operating parameters at that time.

Thus in accordance with the invention there is provided apparatus which can be used for new installations and which apparatus includes the ability to be selectively operated to allow for the reception and processing of circular and linear polarity data.

In a further aspect of the invention there is provided a method for providing apparatus for the selective reception of broadcast data in circular and linear polarity data formats, said method comprising the steps of providing receiving apparatus for use at each of the receiving premises, including in said apparatus the ability to receive broadcast data in both circular and linear polarity data formats, using the apparatus to receive and process data received in only one of said polarity data formats, and wherein at a predetermined time a signal is transmitted to the said apparatus to allow the operating condition of the same to change to receive and process data in the other of said polarity data formats.

In one embodiment, when the signal is received the apparatus can receive and process data in both of said formats.

In one embodiment the method includes the steps of assessing the data polarity format currently used for the broadcast data and setting the newly installed apparatus to receive and process data in that format, changing and replacing the apparatus which has been previously installed with apparatus which can receive both data polarity formats and wherein, once a predefined number of the previously installed apparatus has been replaced, the signal is sent to commence the reception and processing of data in both linear and circular polarity formats.

In a further aspect of the invention there is provided a method of receiving broadcast data, said method comprising providing at each receiving location, an antenna, a low noise block and processing means for processing data received in linear and circular polarity formats, selecting an operating condition for the apparatus to process one, or both, of said data plurality formats and wherein the method further includes the step of transmitting a command signal to each receiving location to enable the operating condition of the apparatus at the receiving location to be changed with respect to the processing of the data polarity formats.

In one embodiment the first operating condition of the apparatus is to allow the processing of data in the circular or linear polarity data formats and the transmission of the command signal causes the operating condition to be changed to receive and process data in both polarity formats.

Typically the command signal is transmitted prior to the first broadcast of data in the circular or linear polarity formats and can be transmitted to a plurality of receiving locations simultaneously.

Typically a broadcast data receiver is connected to the receiving apparatus and selects data to be generated into video and audio in response to a user selection.

A specific embodiment of the apparatus is now described with reference to the accompanying drawing, wherein:—

FIG. 1 illustrates in schematic manner the circuit components included in apparatus in accordance with the invention.

The circuitry herein described is typically mounted with an LNB, Waveguide and antenna (not shown) externally of a premises for receiving data broadcast from a remote location. The data will be broadcast to many thousands of the apparatus, each of which can be provided in accordance with the invention at a premises receiving location. The received data enters the circuit via waveguide probes 2 in both linear and circular polarity formats and passes to Wilkinson Power Dividers 4, 6. The circular polarity format signals, both High and Low pass through the 3 dB Hybrid 1c 8 while the linear polarity signals High and Low power pass along routes 10, 12 respectively. The circular polarity (CP) signals High and Low pass to Wilkinson Power Dividers 14, 16, from which the CP Hi 18, 20 signals pass through oscillators 22, 24 respectively and the CP Low signals, 26, 28 pass to the oscillators 30, 32 respectively.

The Linear polarity format High and Low signals on route 12 pass to the oscillator 32 and the Linear High and Low signals on route 10 pass to the oscillator 30.

In one, typically the initial, operating condition where only circular polarity data signals are required to be used by the apparatus, as only circular polarity format data is being transmitted or broadcast, the circular polarity high signals are emitted to further processing, typically via broadcast data receiver connected to the outputs 34 and 36, via output 34 and the circular polarity low signals are emitted via output 36 so that the conventional data format signals are available for subsequent processing at the broadcast data receiver (not shown) within the premises.

However, in due course, as the number of channels and hence required data to be broadcast to generate the channels, increases, so there will be a need to transmit data in Linear as well as circular polarity format. If or when this is to happen the apparatus needs to be aware and this can be achieved by the transmission of a command signal which may be accompanied by a software download to alter the operating condition of the apparatus and in a particular the circuitry as described in FIG. 1. The Command signal may be simply the commencement of the transmission of data in the new format or may be a separate signal broadcast prior to the broadcast of the new format data. When the change occurs, the Circular polarity format data will continue to be processed as described above but the Linear polarity data can also be selectively accessed via the outlet 36 by operation of the switches 35, 37 in response to the command received from the broadcast data receiver to receive a particular channel selected by the user. The apparatus determines the location of the required data and the format of the data and the switches are selectively operated to allow the appropriate data to pass through to the outlet 36, as required. By the selective control of the apparatus, the data signals in the two formats required can be accessed by the one or more broadcast data receivers and thereby allow all of the data, regardless of the polarity format, to be used.

The linear polarity format data has both Vertical (V) and Horizontal (H) components and the circular polarity format data has Left (LH) and Right (RH) hand components. Preferably, as the components leave a waveguide to which the circuitry is typically connected at the waveguide probes, the orthogonal components have substantially the same phase relationship to each other as when they entered the waveguide. This is of primary importance for Circular Polarity signal types.

As a result of this apparatus, and with reference to the arrangement shown in FIG. 1, the following combinations of data can be selected to pass through the outlets, depending upon the particular operating state at any given time with respect to the required Circular Polarity (CP) and Linear Polarity (LP) format data components to allow the selected television channel to be generated.

| | Output 34 | | Output 36 | |
|---|---|---|---|---|
| State | Lower Band | Upper Band | Lower Band | Upper Band |
| 1 | (CP)LH | (CP)RH | (LP)V | (LP)H |
| 2 | (CP)LH | (CP)RH | (CP)LH | (CP)RH |
| 3 | (CP)LH | (CP)RH | (LP)V | (CP)RH |
| 4 | (CP)LH | (CP)RH | (CP)LH | (LP)H |

In further embodiments using other combinations of switches and Wilkinson Power dividers it is possible to route any combination of polarizations to any combination of bands and outlets.

There is therefore provided a highly adaptable apparatus and system which can be installed over time and therefore introduced in a staggered manner and, thereafter, the operation of the same controlled and altered as required to allow a large scale change of operation to be achieved over a large geographical and/or subscriber range, with minimum inconvenience and at a reduced cost.

The invention claimed is:

1. Apparatus for receiving broadcast digital data disposed at plurality of fixed locations, said apparatus at each of said fixed location comprising:
   an antenna with which is mounted a low noise block (LNB);
   a waveguide probe for linear polarity format data signals;
   a waveguide probe for circular polarity format data signals; and
   a processing circuit to allow circular and linear polarity format data to be selectively received and processed, wherein said processing circuit includes a series of data outlets allowing selective passage of the processed data to at least one broadcast data receiver at that fixed location for the generation of video and/or audio, said outlets allowing the selective passage of the processed data in either one of or both of circular and linear polarity formats in response to a selection signal;
   wherein the processing circuit causes said apparatus to operate in a first state to receive and process data in only one of said linear and circular polarity formats and thereafter, upon receipt of a broadcaster command transmitted to the said apparatus effects a change of state of operation of the apparatus to operate in a second state enabling the apparatus at that fixed location to receive and process, at the same time, data in both linear and circular polarity formats,
   wherein said change of state of operation of the apparatus and the selective passage of the processed data in either one of or both of circular and linear polarity formats are achieved without the need for physical or mechanical alteration or movement of the apparatus at that fixed location, and
   wherein said selection signal indicating the selective passage of either one of or both of circular and linear polarity format data from the data outlets is transmitted by the broadcast data receiver connected to the outlets,
   wherein, when the data signals are received in both the circular and linear polarity formats during the second state of operation of the apparatus, the processing circuit processes the received data such that only said circular polarity format data signals are passed through a 3 dB hybrid to power dividers to split said circular polarity data signals into CP Hi and CP Lo data signals, which pass through respective oscillators to the series of data outlets, while said linear polarity format data signals pass through respective oscillators and one of the outlets.

2. Apparatus according to claim 1 wherein the control of the polarity format data to process is achieved as a result of a change of the control circuit state within said receiving apparatus in response to a received broadcaster command.

3. Apparatus according to claim 1, wherein the apparatus is located externally of a premises in which the broadcast data receiver is located.

4. Apparatus according to claim 1, wherein the broadcaster command to change the state of operation is simultaneously transmitted to each of the apparatus at the plurality of fixed locations so as to change the operating state of each of the apparatus at the plurality of fixed locations simultaneously.

5. Apparatus according to claim 1 wherein the broadcaster command is transmitted from a data broadcaster in the form of a broadcast data signal to the apparatus.

6. Apparatus according to claim 1 wherein the change of state of operation is a result of a required software download which is transmitted from a data broadcaster.

7. Apparatus according to claim 1, wherein the broadcaster command is received from a broadcaster prior to the commencement of the broadcast data in both of the data polarity formats by the broadcaster, and the apparatus is changed to the second state so as to be able to receive and process the subsequently broadcast data in both the data polarity formats.

8. Apparatus according to claim 1, wherein each of the respective oscillators is connected to a mixer via which the processed data is output to the outlets for passage to the broadcast receiver.

9. A method for providing the selective reception of broadcast data in circular and linear polarity data formats, the method comprising the steps of:
   providing a receiving apparatus for receiving broadcast data at each of a plurality of fixed locations, wherein each of the receiving apparatus comprises a 3 dB hybrid, power divider, and a series of outlets;
   initially operating the apparatus in a first state to receive and process broadcast data in only one of said circular and linear polarity data formats;
   transmitting, at a predetermined time, a command by remote broadcast to the apparatus;
   effecting a change of state to the apparatus, responsive to the command, to operate in a second state, enabling the apparatus to receive and process broadcast data in both of circular and linear polarity data formats at the same time;
   selectively obtaining at a broadcast data receiver either one of or both of the circular and linear polarity format data required via the outlets, in response to a selection signal received from the broadcast data receiver connected to the outlets; and
   processing the received broadcast data, when the broadcast data signals are received in both the circular and linear polarity formats during the second state, by passing only the circular polarity format data signals through the 3 dB hybrid to the power dividers for splitting the circular polarity format data signals into circular polarity Hi and circular polarity Lo data signals, and passing said circular polarity Hi and Lo data signals to respective oscillators to the outlets while passing the linear data signals to respective oscillators and one of the outlets, wherein said change of state of operation of the apparatus and the selective passage of the processed data in either one of or both of circular and linear polarity formats are achieved without the need for physical or mechanical alteration or movement of the apparatus at that fixed location.

10. A method according to claim 9 wherein the method further includes the steps of:
assessing the data polarity format currently used for the broadcast data;
changing and replacing an apparatus which has been previously installed at each of the plurality of fixed locations with the receiving apparatus;
wherein, once a predefined number of the previously installed apparatus has been replaced, transmitting the command to change the state of operation of each of the replaced receiving apparatus to commence the reception and processing of broadcast data in both linear and circular polarity formats at the replaced receiving apparatus.

* * * * *